UNITED STATES PATENT OFFICE.

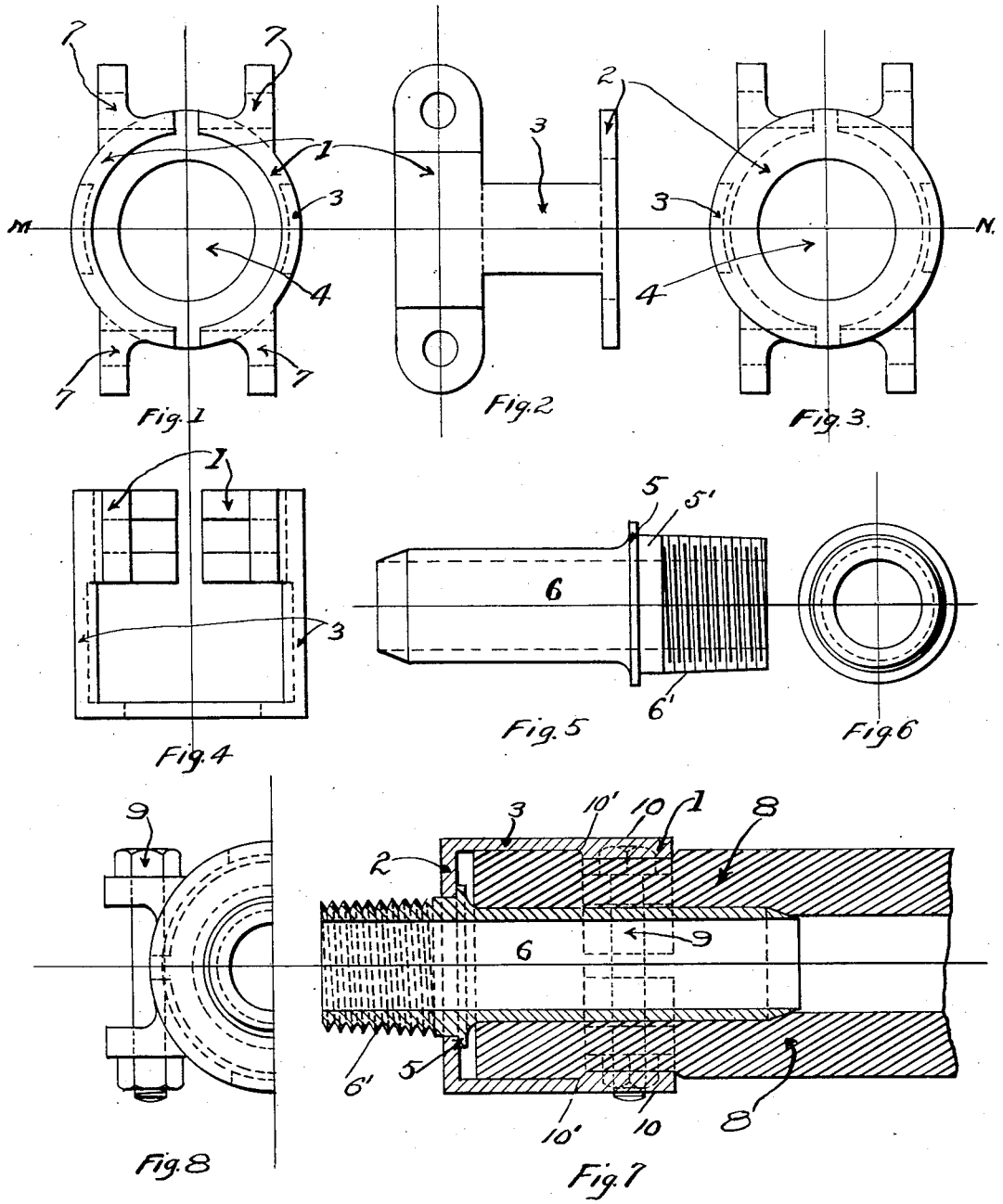

JAMES CLARK, OF BRADFORD, PENNSYLVANIA.

HOSE-CLAMP.

No. 835,300.      Specification of Letters Patent.      Patented Nov. 6, 1906.

Application filed July 24, 1905. Serial No. 271,005.

*To all whom it may concern:*

Be it known that I, JAMES CLARK, a citizen of the United States, residing at Bradford, in the county of McKean and State of Pennsylvania, have invented a new and useful Hose-Clamp, of which the following is a specification.

My invention relates to improvements in hose-clamps for securing the nipples of couplings or unions in the ends of a hose or the like; and it consists of certain novel features of construction, combination, and arrangement of parts hereinafter described and claimed.

The object of the invention is to provide a simple, durable, and inexpensive hose-clamp of this character which will hold the nipple securely in the hose and prevent the possibility of the nipple being blown out by high pressure within the hose.

The above and other objects, which will appear as the nature of my invention is better understood, are accomplished by means of the construction illustrated in the accompanying drawings, in which—

Figure 1 is an elevation of one end of my improved hose-clamp. Fig. 2 is a view of one side of the same. Fig. 3 is a view of the opposite end of the clamp. Fig. 4 is a view of the opposite side of the same. Figs. 5 and 6 are respectively side and end views of the nipple. Fig. 7 is a longitudinal sectional view through the clamp and nipple secured upon the end of the hose; and Fig. 8 is a detail end elevation of one-half of the clamp, showing the latter secured upon the nipple and hose.

Referring to the drawings by numeral, 1 denotes the two jaws of my improved hose-clamp, which are formed integrally upon the free ends of resilient arms 3. The latter project from diametrically opposite points from one face of a head 2, which is in the form of a ring or disk formed with a central opening 4. The opening 4 is adapted to receive the outer screw-threaded end of the nipple 6 and to engage the outer face of an annular flange 5, formed upon the nipple between its outer threaded end and its tapered inner end, which is inserted in the hose 8, as shown in Fig. 7 of the drawings. The engagement of the annular flange 5 with the inner face of the head or ring 2 prevents the removal of the nipple from the hose when the clamp is secured to the hose as in Fig. 7. The clamp is thus secured by bolts or similar fastenings 9, which are passed through apertured lugs 7, formed integral with and upon opposite sides of the two semicircular jaws 1 of the clamp. These apertured lugs 7 are disposed some distance from the ends of said jaw, sand the latter have their inner faces, which engage the exterior of the hose, reinforced, as shown at 10, to provide a shoulder 10' at the intersection of the arms and the reinforce, so that they will become embedded in the hose when the two jaws and their spring or resilient arms 3 are drawn together by tightening the nuts upon the bolts 9. This construction permits the clamp to be securely engaged with the hose, so that it cannot be pulled off, and the nipple 6 will therefore be securely retained in the end of the hose. The nipple 6 may be of the form shown or of any other suitable form and construction, so that it may be engaged with the coacting part of a coupling or union of any description.

I wish it to be understood that the inner surfaces of the arms and their reinforce are made smooth, and, further, the outer surface of the nipple is also made smooth and is not interrupted by projections or teeth.

Having thus described my invention, what I claim as new, and desire to secure by Letters Patent, is—

A hose-clamp comprising spring-arms having reinforced inner ends, each of which is provided with inner, smooth surfaces, semicircular jaws on the outer ends of the arms with an opening between the same, a shoulder formed at the intersection of each arm and its reinforce, a nipple provided with an outer smooth surface having one end of a hose thereon mounted between the arms and reinforce, said nipple having a screw-threaded outer end which projects through and above said opening, said nipple being provided with a flange which serves to contact with the inner surface of the jaws, a cylindrical bearing on said nipple, arranged between its screw-threaded end and its flange, means for clamping the hose between said smooth surfaces of the nipple, the arms and its reinforce and against the shoulder, said means also serving to contact the jaws with the cylindrical bearing, substantially as described.

In testimony whereof I have signed my name to this specification in the presence of two subscribing witnesses.

JAMES CLARK.

Witnesses:
 LESLIE D. BLACKFORD,
 PATRICK J. GANEY.